April 23, 1968 P. W. TILLISCH ETAL Re. 26,382

JOINT STRUCTURE FOR PLASTERBOARD

Original Filed July 15, 1959

3 Sheets-Sheet 1

INVENTORS:
PAUL W. TILLISCH
BY ALBERT F. RAFFAELLI

JOINT STRUCTURE FOR PLASTERBOARD

Original Filed July 15, 1959 3 Sheets-Sheet 2

INVENTOR.
PAUL W. TILLISCH
BY ALBERT F. RAFFAELI
James E. Toomey
ATTORNEY

JOINT STRUCTURE FOR PLASTERBOARD

Original Filed July 15, 1959 3 Sheets-Sheet 3

INVENTOR.
PAUL W. TILLISCH
BY ALBERT F. RAFFAELI
James E. Toomey
ATTORNEY

United States Patent Office

Re. 26,382
Reissued Apr. 23, 1968

26,382

JOINT STRUCTURE FOR PLASTERBOARD

Paul W. Tillisch, Antioch, and Albert F. Raffaeli, Concord, Calif., assignors to Kaiser Gypsum Company, Inc., Oakland, Calif., a corporation of Washington Original No. 3,180,058, dated Apr. 27, 1965, Ser. No. 827,367, July 15, 1959. Application for reissue Oct. 7, 1966, Ser. No. 615,864

8 Claims. (Cl. 52—417)

Matter enclosed in heavy brackets [ ] appears in the original patent but forms no part of this reissue specification; matter printed in italics indicates the additions made by reissue.

This invention relates to a plasterboard of improved joint-forming properties and an improved joint; and it relates more particularly to a method and device for producing such improved plasterboard and joint, in dry wall construction.

Plasterboard as used in building or construction operations is, as is well known, composed of a core consisting essentially of set gypsum crystals with minor amounts of modifying additives, and fibrous or paper covers or "liners" within which such core is deposited and set. In the installation of such boards, which will be understood to include also lath, the boards are placed so that the edges of two boards abut and the board surfaces are in coplanar relationship. In order to form a smooth abutting joint, an adhesive compound or joint cement is filled in at the joints and a fibrous or paper tape is laid over and adheres to such adhesive or cement and overlies a portion of the board adjacent the abutting edge. After this joint structure is set and hardened, finishing compound or plaster is applied over the boards and joint to provide a finished surface. The joint cement or adhesive prevents the appearance or occurrence of unslightly cracks and fissures at the joints after the work is finished and hardened, and assist in maintaining a pleasing surface appearance.

In one method of installation of such boards and the formation of such joints, the operator applies cementitious or adhesive material at the joints, applies tape over the cement, wipes off the excess cement and spreads the material evenly over the joint area by means of a broad knife. and in doing so, often removes too much of the adhesive material, or completely removes it from some portions of the joint zone, so that the tape fails to adhere, air bubbles or blisters form under the tape and the resulting joint is defective and unsightly. In methods where the joint cement is applied by means of a gun, or is pumped onto the joint as a stream of slurry, a rather thin slurry must be fed and the "mud" thereby deposited at the joint may provide insufficient adhesive material, or in other words, may be too lean, and again, joint failures frequently occur from this cause.

It is an object of this invention to provide a plasterboard having improved joint-forming properties. It is another object to provide a method for making a plasterboard having improved joint-forming properties. It is a further object to provide a method for indenting the surface edge zones of paper-lined plasterboards to improve the joint-forming properties thereof. It is another object to provide a device for indenting the surface edge zones of plasterboard. It is a further particular object to provide a device for indenting the surface of a tapered edge of a plasterboard having paper liners. Other objects and advantages of this invention will become apparent from the description below.

The annexed drawings will more completely illustrate and explain the present invention and the various features thereof.

Figure 1:
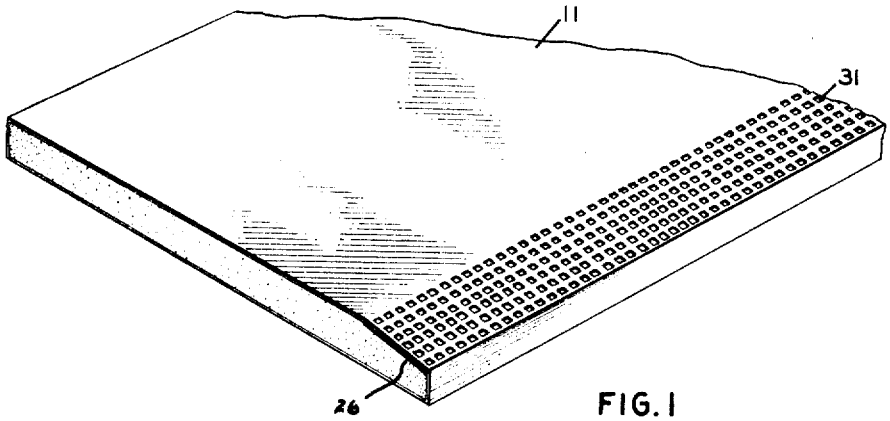
FIGURE 1 is a perspective view of a portion of plasterboard according to the invention, showing location of indentations.

According to the present invention there is provided a plasterboard having a plurality of shallow, discontinuous indentations in multiple rows in at least one surface adjacent the edge thereof, and adapted to retain joint cement applied to such surface to insure a joint which is satisfactory and of pleasing appearance. The indentations or depressions are shallow and do not deleteriously affect the strength of the board edge, and suitably are from 0.003 to 0.012 inch, and preferably from 0.005 to 0.008 inch, in depth. The depressions are of any desired configuration, e.g. of square, round or diamond-shaped cross-section and the bottom or base of such depression can also be of any desired configuration, for example flat, rounded or other. It is suitable that the depressed areas amount to from 15% to 80% of the total area of the zone to be cemented; and that preferably from 20% to 40% of such area be depressed. The indentations may vary in depth from one to another, i.e. as among themselves. That is to say, every depression need not be of the same depth as every other depression.

The indentations are disposed in a zone of the plasterboard surface at the edge thereof and preferably extending from the edge of the board inwardly to cover at least and preferably slightly more than the area which will eventually underlie the tape to be applied when the board is installed. For example, in the usual installation, it is preferred that the indentations be disposed in a longitudinal zone extending inwardly about 1.5 inches from the edge of the board, so that in applying a tape of about 2 to 2⅛ inches width, presence of joint cement at and beyond the edge of the tape insures adhesion over the whole width of such tape, and a tight joint of pleasing appearance, after application of the finishing compound. The indentations are disposed at one or more edges of the board, as desired.

The indentations are applied to any desired gypsum core board, suitably board having paper covers or liners, such as wallboard, lath, light weight wallboard, fire-resistant wallboard of heavier unit weights, or other. In many instances, such boards are provided with tapered edges to form the joints because such tapers have been deemed to receive and retain joint cement and tape and provide a uniform surface. However, it has been found in practice that wiping with a broadknife still removes excessive amounts of joint cement from the small valleys provided by such taper. Such removal is especially excessive at the outer edge of the taper where it meets the plane surface of the board and results in blisters or in failure to bond the edge of the later-applied tape, so that the tape is liable to tear when finishing compound is applied and an unsatisfactory joint results. It will be understood, of course, that the taper is necessarily slight in order to maintain strength of the board edges. According to this invention, a plurality of shallow, discontinuous depressions or indentations are provided in or at the tapered surfaces and insure retention in such surface of the required joint cement. The indentations are provided likewise in multiple rows to provide for a sufficient number of depressions to effect a satisfactory cementing action, as disclosed above.

In the production of the indentations a plasterboard having paper liners and a core of interlaced set gypsum crystals is formed in the usual way known in this art, that is, by preparing a water slurry consisting essentially of calcined gypsum, such slurry being understood to contain any desired additive or modifying ingredient such as starch, expanded perlite, vermiculite, asbestos, sawdust, glass or paper fibers, an accelerator such as $K_2SO_4$ or a retarder such as partially hydrolyzed protein, and any other desired ingredient. The calcined gypsum plastic slurry is deposited on a paper liner on a board-forming line, preferably the edges of the liner are folded over on the slurry to form a covered-edge board, and a top liner is placed over the slurry. The board is formed under a suitable smooth-surfaced roll to the desired thickness, e.g. of ⅜ inch, ½ inch, ⅝ inch or other, and is forwarded on a supporting belt toward the drier.

After the gypsum core has acquired its initial set, the indentations are formed in the board surface under suitable pressure. Preferably, this formation is effected prior to final set; but it can be done after final set, at which time considerably increased pressures will be employed. It has been found that the application of pressure between initial and final setting times results in a satisfactory permanent deformation of the paper liner and the surface of the gypsum core with lower pressures. In making the depressions by the method of the invention, it has been an unexpected result that strength of the core edge is retained and no cracks or destructive fissures are found through the edge, the depressions being only at the surface and of very slight extent. The pressure applied is such pressure as is sufficient to effect the desired depression, and this is usually apparent upon inspection. After the gypsum core has acquired its initial set, it will no longer be subject to plastic flow, although not completely hardened, and the depressions formed retain their form and shape. Thus, preferably, the forming pressure is applied for a short time only, and advantageously by means of a toothed or embossed roller, as will be further described below. A plurality of indentations are pressed into the board surface adjacent one or more edges thereof, being disposed in multiple rows in a zone extending a short distance inwardly from the edge and generally parallel thereto.

A device for effecting the indentations according to the present invention comprises an embossed means for indenting, a pressure means to enable impressing the embossed means on the board surface, and preferably means for rotating the embossed means at an angle to the horizontal, along its axis, to conform to the taper where a tapered edge board is to be indented.

Figure 4:
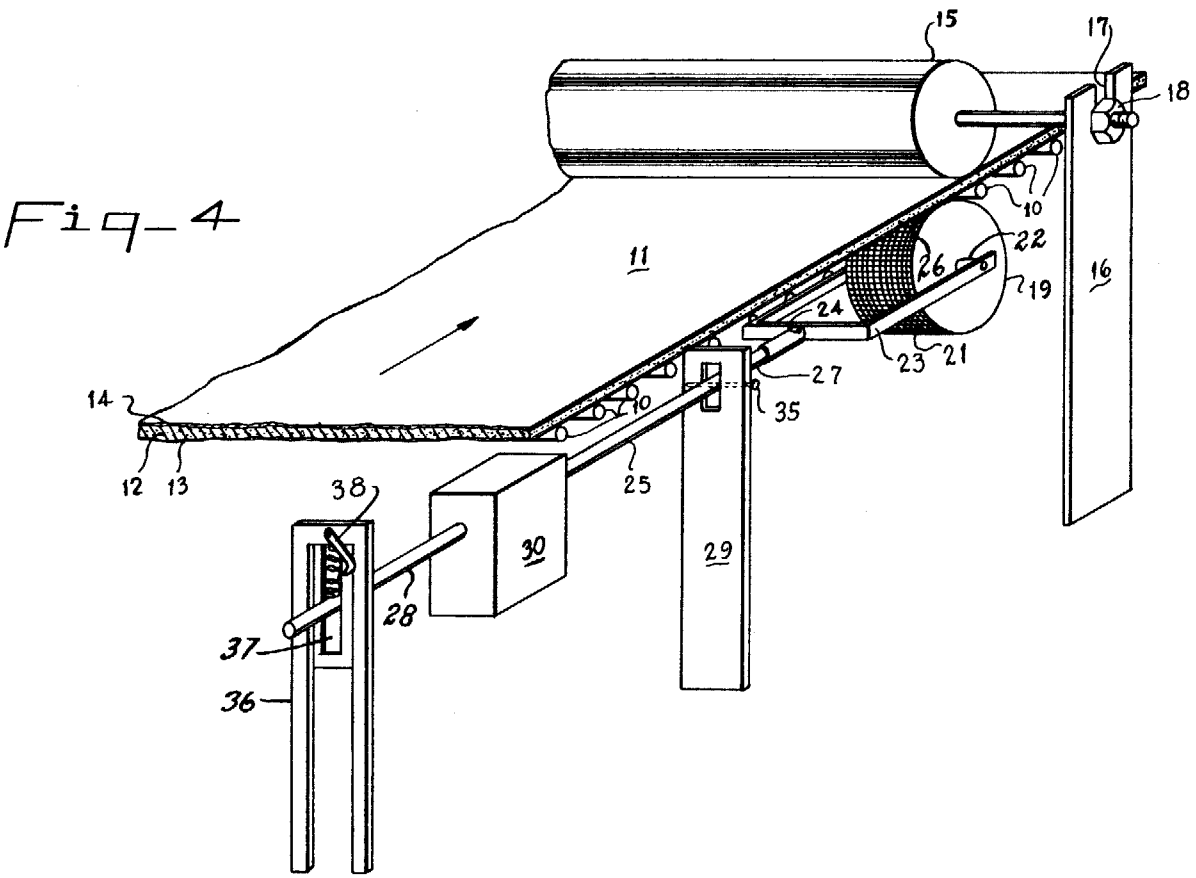
FIGURE 4 is a perspective view of one side of a board-making apparatus showing the indenting step of the operation in particular.
Figure 5:
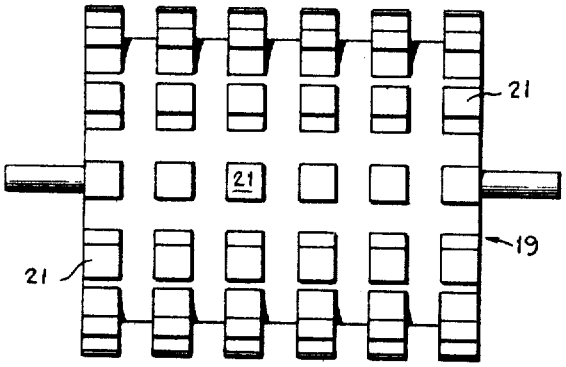
FIGURE 5 is a top view of an element of the indenting device according to the present invention.

One suitable device for carrying out this invention is shown in FIGURES 4 and 5. FIGURE 4 shows a horizontal board line having a series of rollers 10 to support board 11 which is composed of core 12 consisting essentially of a mass of set gypsum crystals with any desired additives, facing paper liner 13 and backing paper liner 14. The board has come from the board-forming station which is well known in this art and will not be further described herein, and the board core has acquired its initial set. The board now passes beneath superposed hold-down means, e.g. roller 15 which is a steel cylinder of any desired diameter, extending across board 11 and of sufficient weight to hold the board against the indenting pressure to be applied. Roller 15 is supported at each end on a suitable standard 16 provided with a notch 17 at the top to support roller 15, the roller being vertically adjustable; to accommodate different board thicknesses, by means of lock nut 18.

Figure 7:
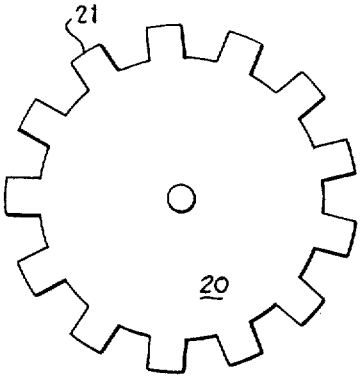
FIGURE 7 is a side view of the device of FIGURE 5.

Disposed beneath the board line and adjacent the outer edge of the lower surface of board 11 is embossed roller 19 which is a steel cylinder having bosses 21 disposed over its periphery. In the embodiment shown in FIGURES 5 and 7, bosses 21 are square in shape, arranged in a plurality of rectilinear vertical and horizontal rows, and occupying about 25% of the total surface area of cylinder 20. In the embodiment shown the bosses are about ⅛ inch in depth, but this is variable except that the bosses are at least slightly more than the depth, of indentation desired. Thus, the height, or depth, of the embossing protuberance or lug is easily determined for any given indenting operation.

Roller 19 is supported at both ends, as shown at 22 in FIGURE 4, by a forked or bifurcate support means 23, At the central portion of the base of bifurcate support, or yoke 23, lever arm 25 is rotatably connected by means of a ball-and-socket joint, indicated at 24. Yoke 23 thus rotates freely on arm 25, and therefore roller 19 is brought into uniform contact over its width with varying tapers of wallboard edge surface 26. Disposed between the two ends 27 and 28 of lever arm 25 is pivot support means 29 which acts as a fulcrum in the operation of the indenting device and method, as will be later explained. Lever arm 25 is fixed against forward travel by pin 35 in fulcrum 29, in this embodiment. End 28 of lever arm 25, beyond weight 30 passes through slot 37 of guide means 36, which acts to prevent roller 19 from swinging out of line during forward motion of the board. When it is desired to release roller 19 from contact with the board surface, latch 38 catches and holds end 28 of arm 25, lowering roller 19 out of operative position.

In the mode of operating the device and the embodiment thereof shown in FIGURE 4, a weight 30 is applied at end 28 of arm 25, and this acting through fulcrum 29 forces roller 19 upwardly against the lower edge surface 26 of board 11. As board 11 moves forward (shown by the arrow) on support rollers 10, embossed roller 19 rotates freely at 22, and pressing against the lower surface of the board forms therein a multiplicity of indentations, as shown in the board of FIGURE 1, for example, at 31, disposed in a plurality of longitudinal and transverse rows with respect to the board edge. It has been found that a presure of from 150 to 300 lbs. per square inch applied at close to the initial setting time of the core provides suitable indentations. Increasing pressures, up to about 450 lbs. per square inch, for example, are applied when indentations are formed in the board at times approaching the final setting time; and pressures of 600 to 800 p.s.i. are useful if indenting after final set. For instance, if the roller 19 in FIGURE 4 is so disposed in the board line that when pressed against the board it indents just after the core has taken its initial set, it has been found that a satisfactory result is achieved with a pressure of about 200 lbs. per square inch. On the other hand, if the roller 19 is disposed farther from the forming station along the board line and at a point where the core is about to take its final set, it has been found that a pressure of about 400 lbs. per square inch gives a satisfactory result.

Figure 2:
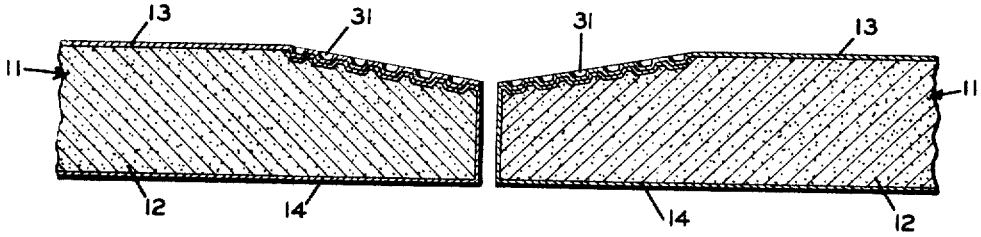
FIGURE 2 is a sectional view through two abutting tapered boards according to the invention.
Figure 3:
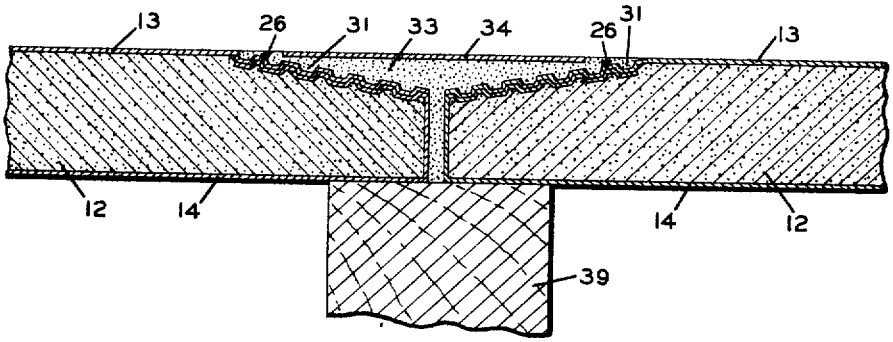
FIGURE 3 is a sectional view through a tapered joint according to this invention.

The embossed roller 19 forms in the board surface indentations as shown at 31 in FIGURE 1. If the edge is tapered or bevelled, the roller 19 is rotatably inclined, as at 24, to conform to such taper or bevel. These can be arranged in rectilinear rows or at random, but there is a plurality of indentations over the width and longitudinally of the edge to be taped. The depth and arrangement of indentations in a tapered edge board or lath are shown more clearly in FIGURES 2 and 3, wherein the size of each indentation is exaggerated. However, it is found in practice that indentations are exhibited both by the paper liners 13, 14 and the gypsum core 12. In FIGURE 2 there are shown two boards 11, 11 placed in abutting relation as such boards will be installed. A joint is formed therebetween by applying joint cement 33 which fills up the recess formed by the tapered portions of edges 26, 26 and also fills indentations 31 which are so disposed in the taper that some of them will underlie the edge of the tape to be applied.

After the joint cement has been filled into the area where the joint is to be formed, wallboard tape 34 is applied and adhesively attached by means of the cement, and excess cement is wiped off with a broadknife, some being retained in indentations 31. The joint cement employed can be of any desired composition, several such cements being well known in this art. A suitable type of joint cement is shown, for example, in Riddell and Kirk, U.S. Patent 2,662,024, issued December 8, 1952.

As an example of the method of carrying out this invention, a lightweight wallboard is formed by depositing between paper liners a plastic slurry in water of an admixture of calcined gypsum, expanded vesiculated perlite, sawdust, starch and a retarder, as described in Riddell and Kirk, U.S. Patent 2,803,575, issued August 20, 1957. The core and liners are passed between forming rolls and then forwarded along the board line on a supporting belt until the core has taken its initial set, as will be shown for example by testing with the Vicat apparatus to see whether it still exhibits plastic flow, after which the board moves forward on rollers 10. The indenting roller 19 is placed in the line just beyond the stage where the board has taken its initial set, and a weight 30 is placed at end 28 of lever arm 25 to apply a pressure of about 200 lbs. per sq. in. at the contact between roller 19 and board face edge 26. In this example, the indenting roller has square protuberances, each about ⅛-inch on a side and about ⅛-inch deep, the protuberances or teeth occupying about 25% of the area of the roller surface. The roller indents the board face from the edge inwardly about 1.5 inches, applying six rows of indentations, each indentation being about 0.005 to 0.008 inch in depth. The board moves forward along the line until the core takes its final set, and thence to the drying zone where it is dried at a temperature of from about 210 degrees F. to about 400 degrees F., the temperature preferably not exceeding about 350 degrees F. At the end of the drying cycle the board is removed from the drying zone and cut into the desired lengths, weighing about 1900 lbs./1000 sq. ft. The board edges exhibit the desired permanent indentations which have not been effected by the completion of hardening and the drying steps. The boards are installed to form the interior walls of a building, using a commercial joint cement and wallboard tape, with formation of excellent joints, firm adhesion of the tape to the joint areas and freedom from tears or non-adhered portions.

It is an advantage of the invention that the depressions are not subject to damage in handling and shipping because the plane surface is of such extent as to protect the depressions whereas projections raised above the plane surface of the board edge would be liable to shear off or be distorted during manipulation of the board. It is a further advantage of the invention that the device provided for forming the depressions is of simple, inexpensive construction and can be readily installed in the usual commercial board-forming arrangement without disruption of the usual peration thereof.

Figure 6:
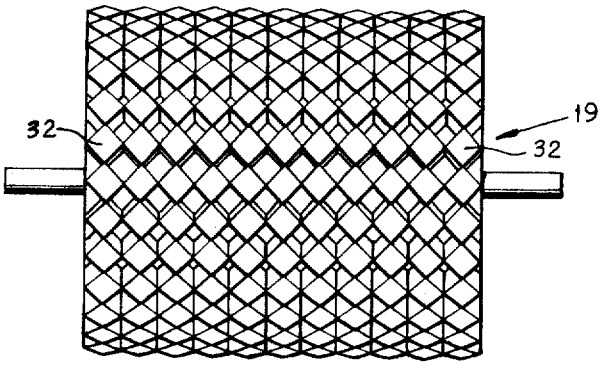
FIGURE 6 is a top view of another embodiment of the indenting device.

In the above description, pressure has been shown to be applied to the embossed roller by means of a weight on a lever arm but, alternatively, such pressure can be applied by a spring means or, in other words, the lever arm can be spring-biased. An alternative design for a roller, having diamond-shaped protuberances 32, is shown in FIG. 6. Also, other means of applying such pressure can be employed, if desired. Suitably, the embossed roller is of steel, but other hard-surfaced roller means can be employed. Alternatively, the discontinuous depressions can be impressed by impact means, but a roller is an efficient continuous device for the purpose. The example has shown applying the depressions at the edge of a lightweight gypsum core board, but they can also be applied to boards having other gypsum core compositions, e.g., as containing foam cells, or being of heavier construction, higher pressures generally being desirable with heavier core compositions. In dry wall construction a pair of such boards are placed on a support (e.g. stud 39) in abutting relation, joint cement or adhesive applied, then fibrous tape is applied and excess cement removed, as described above, and then finishing cement is applied over the joint.

The discontinuous, shallow depressions are preferably impressed in the gypsum core board edge surface at a time between the initial setting time and the final setting time to provide suitable indentations without damage to the core edge. However, the indentations can alternatively be impressed after the final setting time with application of greater pressures than are required when working within the preferred interval. In forming the indentations, the paper liners are not broken but merely exhibit depressions therein. Where the term "edge surface" or "edge of surface" is employed herein, it is to be understood to mean the zone along the edge at a face of the board in question rather than the narrow transverse or sectional edge across the depth or thickness of the board, the latter being the ⅜ inch, ½ inch or like dimension. The surface in question, in other words, is that parallel to the tape which is later applied. It is preferred that the surface area of the joint zone of the board exhibit no extensive plane surface without indentations closely adjacent the edge.

The initial set of the core often takes place within two minutes after formation of the board, but this can be changed by the addition of an accelerator or retarder, as desired. The final set may take place from eight to fifteen minutes after the initial set, but this also varies depending upon the addition of accelerator or retarder, and it can be determined in any event by observing the temperatures exhibited by the core. That is, setting is an exothermic reaction and results in a rise in temperature in the core, and when the temperature levels off and no longer rises, final set will have occurred. The initial set can be determined by taking samples of the slurry feed at intervals, allowing to set and testing with a Vicat needle in the known way. In a board line, the board from the forming station is supported on a belt until initial set has occurred and then is forwarded on rollers, so that in practice it is useful to indent just after the board leaves the belt. It is to be understood that the indentations can be formed in a tapered edge or a straight or nontapered board surface, preferably to from 1 to 2 inches in from the edge.

The tape employed is of any desired type and can be plain, spark-punched or other.

It is to be understood that the above specific description and example are given for purposes of illustration only and that variations and modifications can be made therein without departing from the spirit and scope of the appended claims.

Having now described the invention, what is claimed is:

[1. Plasterboard of improved joint-forming property consisting essentially of a core of interlaced set gypsum crystals and paper liners covering the faces of said board, said board having shallow, discontinuous depressions disposed in a plurality of transverse and longitudinal rows in a zone of a surface of said board adjacent an edge only of said surface and adapted to underlie the edge of later-applied wallboard tape.]

[2. Plasterboard as in claim 1 wherein said depressions are from 0.003 to 0.012 inch in depth.]

[3. Plasterboard as in claim 1 wherein said depressions occupy from 15% to 80% of the area of said zone.]

[4. In dry wall construction a pair of gypsum core boards disposed in abutting relation to form a joint, said boards having tapered edges and shallow, discontinuous depressions disposed in a plurality of longitudinal and transverse rows in said tapered edges, joint cement on said tapered edges at said joint and fibrous tape applied over said cement at least some of said depressions underlying the edges of said tape.]

5. Plasterboard of improved joint cement retention property consisting essentially of a core of set gypsum crystals and paper liners covering said core, a tapered edge at one face of said paper-covered core, and shallow, discontinuous joint cement-retaining depressions in said paper and core at said tapered edge, said depressions being disposed within said tapered edge surface in a plurality of transverse and longitudinal rows and maintaining said paper in unbroken state, and adapted to underlie the edges of tape when assembled.

6. Plasterboard as in claim 5 wherein said depressions are from 0.003 to 0.012 inch in depth.

7. Plasterboard as in claim 6 wherein said depressions are from 15% to 80% of the total area of the surface of said tapered edge.

[8. In dry wall construction a pair of gypsum core boards, each of said boards consisting essentially of a core of set gypsum crystals and paper liners covering said core, said boards being disposed in abutting relationship to form a joint, the abutting edge of each of said boards tapering to form a cement-receiving depression in combination with the edge of the other of said pair of boards, shallow, discontinuous joint cement-receiving depressions disposed in a plurality of longitudinal and transverse rows in said paper liner and said core in each of said tapered edges, joint cement in said joint and retained in said depressions and fibrous tape disposed over said joint and depressions and in contact with said joint cement at least some of said depressions underlying the edges of said tape.]

*9. Plasterboard of improved joint-forming property consisting essentially of a core of interlaced set gypsum crystals and paper liners covering the faces of said board, said board having shallow, discontinuous depressions disposed in a plurality of transverse and longitudinal rows in a zone of a surface of said board adjacent an edge only of said surface and maintaining said paper in unbroken state, and adapted to underlie the edge of later-applied wallboard tape.*

*10. Plasterboard as in claim 9 wherein said depressions are from 0.003 to 0.012 inch in depth.*

*11. Plasterboard as in claim 9 wherein said depressions occupy from 15% to 80% of the area of said zone.*

*12. In dry wall construction a pair of gypsum core boards having paper covers and disposed in abutting relation to form a joint, said boards having tapered edges and shallow, discontinuous depressions disposed in a plurality of longitudinal and transverse rows in said tapered edges and maintaining said paper in unbroken state, joint cement on said tapered edges at said joint and fibrous tape applied over said cement, at least some of said depressions underlying the edges of said tape.*

*13. In dry wall construction a pair of gypsum core boards, each of said boards consisting essentially of a core of set gypsum crystals and paper liners covering said core, said boards being disposed in abutting relationship to form a joint, the abutting edge of each of said boards tapering to form a cement-receiving depression in combination with the edge of the other of said pair of boards, shallow, discontinuous joint cement-receiving depressions disposed in a plurality of longitudinal and transverse rows in said paper liner and said core in each of said tapered edges and maintaining said paper in unbroken state, joint cement in said joint and retained in said depressions and fibrous tape disposed over said joint and depressions and in contact with said joint cement, at least some of said depressions underlying the edges of said tape.*

References Cited

The following references, cited by the Examiner, are of record in the patented file of this patent or the original patent.

UNITED STATES PATENTS

| | | | |
|---|---|---|---|
| 584,748 | 6/1897 | Roome | 52—437 |
| 1,586,018 | 5/1926 | Westberg | 52—443 |
| 1,589,569 | 6/1926 | Schumacher | 52—443 X |
| 1,638,280 | 8/1927 | Utzman | 52—344 X |
| 1,735,447 | 11/1929 | Zaisser | 52—417 |
| 2,044,234 | 6/1936 | Walper | 156—44 |
| 2,318,053 | 5/1943 | Brusse | 52—417 |
| 2,479,207 | 8/1949 | Buttress | 156—347 |
| 2,708,300 | 5/1955 | Buttress | 52—449 X |
| 2,814,080 | 11/1957 | Tvorik et al. | 52—417 |
| 2,850,404 | 9/1958 | Dunlap | 52—417 |
| 2,879,662 | 3/1959 | Spinelli | 52—449 |

FRANK L. ABBOTT, *Primary Examiner.*

ALFRED C. PERHAM, *Examiner.*